United States Patent
O'Konski et al.

(10) Patent No.: US 9,646,636 B2
(45) Date of Patent: May 9, 2017

(54) METHODS OF MANUFACTURING MAGNETIC HEADS USING A TRIGGER READER ELECTRONIC LAPPING GUIDE

(71) Applicant: Seagate Technology LLC, Cupertino, CA (US)

(72) Inventors: Jeffrey R. O'Konski, Savage, MN (US); Garrick F. Shurts, Savage, MN (US); Greg A. Schmitz, Princeton, MN (US); Gregory P. Shaffer, Rosemount, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/942,179

(22) Filed: Nov. 16, 2015

(65) Prior Publication Data
US 2016/0071535 A1    Mar. 10, 2016

Related U.S. Application Data

(62) Division of application No. 14/053,071, filed on Oct. 14, 2013, now Pat. No. 9,190,083.

(51) Int. Cl.
*G11B 5/31* (2006.01)
*G11B 5/48* (2006.01)
(Continued)

(52) U.S. Cl.
CPC .......... *G11B 5/4826* (2013.01); *B24B 37/013* (2013.01); *B24B 37/048* (2013.01);
(Continued)

(58) Field of Classification Search
None
See application file for complete search history.

(56) References Cited

U.S. PATENT DOCUMENTS

| | | |
|---|---|---|
| 5,023,991 A | 6/1991 | Smith |
| 5,597,340 A * | 1/1997 | Church ................ B24B 37/005 |
| | | 29/603.16 |

(Continued)

FOREIGN PATENT DOCUMENTS

| | | | |
|---|---|---|---|
| JP | 2005339781 A | * | 12/2005 |
| JP | 2008059714 A | * | 3/2008 |
| WO | WO 9502241 A1 | * | 1/1995 ........... G11B 5/1871 |

*Primary Examiner* — Will J Klimowicz
(74) *Attorney, Agent, or Firm* — Kagan Binder, PLLC

(57) ABSTRACT

A method of manufacturing a magnetic read-write head, including the steps of presenting a row bar to a processing location, the row bar including an air bearing surface, at least one read-write head, at least one electronic lapping guide, and at least one trigger device, wherein each electronic lapping guide is positioned at a different distance from the air bearing surface than each trigger device, and wherein the read-write head and at least one of the trigger devices include a multi-layer stack of materials; lapping the air bearing surface while measuring the electrical resistance of at least one electronic lapping guide and at least one trigger device until the resistance measurement of the trigger device provides an open circuit reading, and measuring an offset resistance value of the at least one electronic lapping guide concurrently with the measurement of the open circuit reading by the trigger device.

11 Claims, 2 Drawing Sheets

(51) Int. Cl.
*B24B 37/013* (2012.01)
*B24B 37/04* (2012.01)
*B24B 49/10* (2006.01)
*G11B 5/147* (2006.01)
*G11B 5/187* (2006.01)
*G11B 5/60* (2006.01)

(52) U.S. Cl.
CPC .............. *B24B 49/10* (2013.01); *G11B 5/147* (2013.01); *G11B 5/187* (2013.01); *G11B 5/3166* (2013.01); *G11B 5/3169* (2013.01); *G11B 5/3173* (2013.01); *G11B 5/6082* (2013.01)

(56) References Cited

U.S. PATENT DOCUMENTS

| | | | |
|---|---|---|---|
| 6,193,584 B1 * | 2/2001 | Rudy | B24B 37/013 29/593 |
| 6,347,983 B1 * | 2/2002 | Hao | B24B 37/04 29/603.09 |
| 6,532,646 B2 * | 3/2003 | Watanuki | G11B 5/3166 29/603.09 |
| 6,609,948 B1 | 8/2003 | Fontana, Jr. et al. | |
| 6,831,277 B1 * | 12/2004 | Nakata | G11B 5/3103 250/372 |
| 7,290,325 B2 | 11/2007 | Wu | |
| 7,681,303 B2 * | 3/2010 | Kondo | G11B 5/1278 29/603.09 |
| 7,861,400 B2 * | 1/2011 | Lille | B24B 37/00 29/603.09 |
| 8,003,304 B2 * | 8/2011 | Nikitin | G11B 5/1278 29/603.09 |
| 8,165,709 B1 * | 4/2012 | Rudy | G11B 5/3166 700/121 |
| 8,291,743 B1 * | 10/2012 | Shi | G11B 5/3169 702/104 |
| 9,153,260 B1 * | 10/2015 | Rudy | G11B 5/3166 |
| 2008/0273265 A1 | 11/2008 | Gee et al. | |
| 2009/0168268 A1 | 7/2009 | Druist et al. | |

* cited by examiner

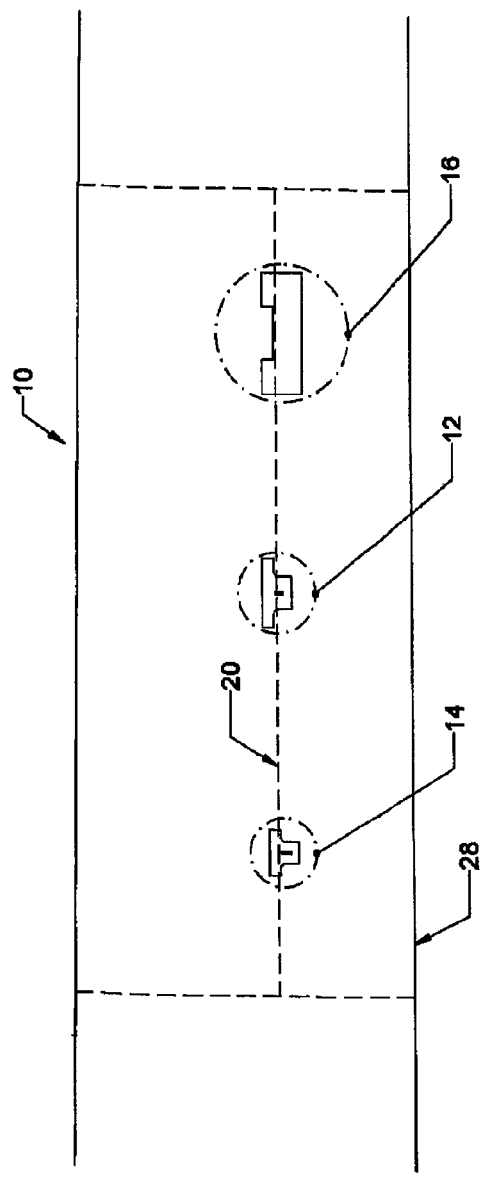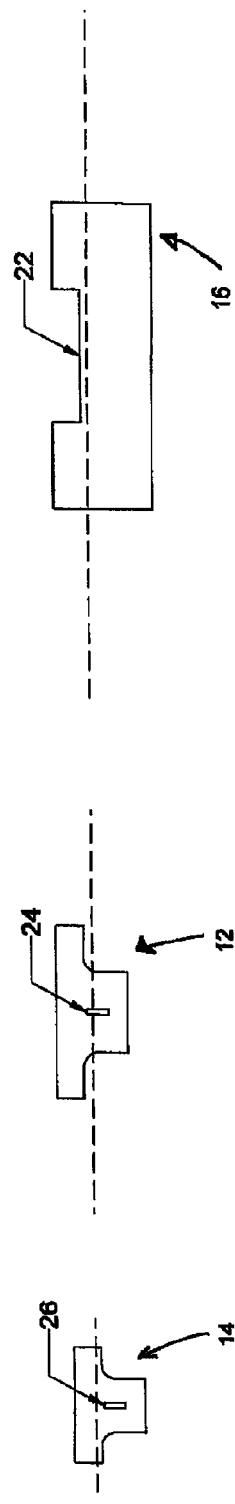

METHODS OF MANUFACTURING MAGNETIC HEADS USING A TRIGGER READER ELECTRONIC LAPPING GUIDE

CROSS REFERENCE TO RELATED APPLICATIONS

This application is a divisional of U.S. application Ser. No. 14/053,071, filed Oct. 14, 2013, the disclosure of which is incorporated by reference in its entirety herein.

BACKGROUND

Hard disc drives are common information storage devices having of a series of rotatable disks that are accessed by magnetic reading and writing elements. These data transferring elements, commonly known as transducers or heads, are typically carried by and embedded in a slider body that is held in a close relative position over discrete data tracks formed on a disc to permit a read or write operation to be carried out. In order to properly position the transducer with respect to the disc surface, an air bearing surface (ABS) formed on the slider body experiences a fluid air flow that provides sufficient lift force to "fly" the slider and transducer above the rotating disc data tracks.

Some of the major objectives in disc drive designs are to fly the slider and its accompanying transducer as close as possible to the surface of the rotating disk. The flying height of the slider is viewed as one of the most critical parameters affecting the magnetic disc reading and recording capabilities of a mounted read/write element. A relatively small flying height allows the transducer to achieve greater resolution between different data bit locations on the disc surface, thus improving data density and storage capacity. With the increasing popularity of lightweight and compact notebook type computers that utilize relatively small yet powerful disc drives, the need for a progressively higher data density and storage capacity has continually grown. In addition, with the importance of providing accurate data storage and retrieval capability for these disc drives, it is desirable to precisely and repeatedly control processing parameters for the read/write heads during the manufacturing process.

SUMMARY

One or more trigger devices are provided on a row bar that also includes at least one electronic lapping guide, wherein such trigger devices can help to accommodate for any variability of stock to be removed at lapping and also any variability of the lap rate during the lapping process, particularly in cases where differences in dimensions, materials, focal planes, and underlying topography, and/or adjacent topography cause patterning differences between these two features. Thus, edge-to-edge placement variability can be improved, which in turn will improve the accuracy of the electronic lapping guide and improve the stripe height standard deviation in the finished read-write head.

In one aspect of this invention, a method of manufacturing a magnetic read-write head is provided, comprising the steps of presenting a row bar to a processing location relative to a lapping device, the row bar comprising an air bearing surface, at least one read-write head, at least one electronic lapping guide, and at least one trigger device, wherein a reference surface of each electronic lapping guide is positioned at a different distance from the air bearing surface than a reference surface of each trigger device, and wherein the read-write head and at least one of the trigger devices comprise a multi-layer stack of materials; lapping the air bearing surface with the lapping device while measuring the electrical resistance of the at least one electronic lapping guide and the at least one trigger device until the resistance measurement of the at least one trigger device provides an open circuit reading; and measuring an offset resistance value of the at least one electronic lapping guide concurrently with the measurement of the open circuit reading by the at least one trigger device.

In another aspect of the invention, a row bar comprising an air bearing surface, at least one read-write head, at least one electronic lapping guide, and at least one trigger device, wherein a reference surface of each electronic lapping guide is positioned at a different distance from the air bearing surface than a reference surface of each trigger device, and wherein the read-write head and at least one of the trigger devices comprise a multi-layer stack of materials.

These and various other features and advantages will be apparent from a reading of the following detailed description.

BRIEF DESCRIPTION OF THE DRAWINGS

The present invention will be further explained with reference to the appended Figures, wherein like structure is referred to by like numerals throughout the several views, and wherein:

FIG. 1 is a top schematic view of a portion of a row bar that includes a trigger device positioned relative to a reader device, according to one aspect of the present invention;

FIG. 2 is a top view of a trigger device of FIG. 1;

FIG. 3 is a top view of a reader device of FIG. 1;

FIG. 4 is a top view of an electronic lapping guide of FIG. 1; and

DETAILED DESCRIPTION

Figure 5:
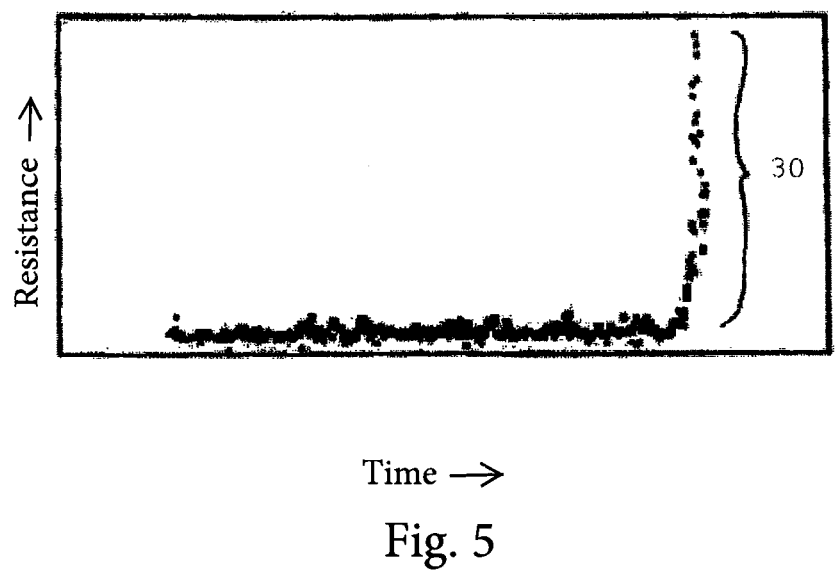
FIG. 5 is a graph of the performance of a trigger device during an exemplary lapping process, according to one aspect of the present invention.

Referring now to the Figures, wherein the components are labeled with like numerals throughout the several Figures, and initially to FIGS. 1-4, one configuration of a portion of a row bar 10 is illustrated, in accordance with the invention. Row bar 10 generally includes a reader device 12, a trigger device 14, and an electronic lapping guide (ELG) 16 arranged relative to a lapping surface or air bearing surface 20. In order to provide the desired performance for this configuration, certain elements of the row bar 10 are arranged at different distances from the air bearing surface 20, as will be described in further detail below. The arrangement of these components will be used to determine the stripe height during lapping of the reader device for a hard disk drive (HDD). The reader device is used for reading data from the disc and as a servo control feedback for positioning the slider relative to the data track on the disc.

As described herein, exemplary manufacturing methods and devices can be used for linear tape drive systems that use magnetoresistive tape heads for performing read/write operations on magnetic storage media. Alternatively, the various methods and devices described herein can be used for other magnetic storage media and devices, such as hard disks, floppy disks, or other magnetic storage systems, for example.

The stripe height can be defined as the distance between the air bearing surface and the back edge of the reader device 12. The reader device performance can be tied directly to the level of control of the stripe height, and the use of a trigger device as described herein can help to reduce stripe height variation during lapping. After the row bar 10 and its various components and devices are manufactured using wafer processing techniques, lapping processes can be used to remove material at the air bearing surface until a desired stripe height is achieved. In particular, with regard to the ELG 16, its resistance can be measured, monitored, and compared to predetermined or calculated ELG resistance values to determine when a particular ELG height is reached or achieved. The trigger device 14 can help determine the difference between stripe height and ELG height for any adjacent ELGs on the same row bar.

Trigger device 14 of the row bar 10 can be generally configured to be similar or identical in structure to that of the reader device 12 and will be interlaced with the ELG 16 on the same row bar 10. The trigger device 14 can be electrically connected to a structure, such as a gold pad, so that the resistance of the trigger device can be monitored in real time during the lapping process, simultaneously to the ELG 16. In an embodiment of the row bar 10, the trigger device 14 includes the same materials to those of the reader device 12 of the same row bar, wherein the materials of the trigger device are also provided with the same thicknesses and material layer arrangements as those provided for the reader device 12. That is, both the reader device 12 and the trigger device 14 can be provided as a multi-layer stack of materials (e.g., 13 layers, although more or less than 13 layers can be used), wherein each of the layers can be the same and provided in the same order in both devices. However, in an embodiment of the row bar 10, the materials used for the trigger device 14 and the reader device 12 are not all identical to each other, but at least some of the materials and/or material layers are different from each other and/or arranged differently from each other. In this case, it is desirable for each of the layers to have material properties that respond in the same way to wafer processing.

The ELG 16 may be made of a number of different materials, wherein each of such structures is provided as a thin film resistor, Such ELG devices can be embedded or encased within a field of alumina, for example. In an embodiment of the ELG 16, it is provided as a single layer that can be approximately the same thickness as the reader device 12.

As illustrated in FIG. 1, and the enlarged views of portions thereof illustrated in FIGS. 2-4, the row bar 10 is in its un-lapped configuration prior to processing or after partial processing thereof. In this configuration, a face surface 22 of the electronic lapping guide 16 and a face surface 24 of the reader device 12 are both above the final lapped air bearing surface 20 and therefore remain after lapping; however, a face surface 26 of the trigger device 14 is below surface 20 and is therefore lapped through during normal processing.

The electronic lapping guide (ELG) 16 can be a thin film resistor that is provided as an analog device. With such an ELG, the electrical resistance measured during processing will increase with material removal during the lapping process. With the use of the trigger device 14, a secondary trigger signal will be generated to calibrate the electronic lapping guide 16. This calibration will allow the electronic lapping guide 16 to more accurately target the reader stripe height, thereby improving the standard deviation of the reader stripe height.

The trigger device 14 is provided as a digital device with a resistance that can optionally be continually measured during the lapping process, as is shown graphically in FIG. 5. As is represented in this graph, the resistance will be generally constant over time until the back edge of the trigger device 14 is lapped through. At this point, an open circuit reading will be registered, as is shown in the area represented by bracket 30. The heights of any adjacent ELG(s) 16 will be compared to the design dimensions of the device, and then any difference(s) can be used to adaptively adjust the ELG 16 targets during the remainder of the lapping process. However, because the point at which the open circuit reading is registered is considered to be a "trigger" point after which other parameters of the row bar can be measured and adjusted, the resistance (or any other parameters) of the trigger device 14 does not necessarily need to be measured during the lapping process. Rather, the trigger device 14 can be monitored until the open circuit reading occurs, and then no further monitoring of this device is needed.

Although a row bar using a single trigger device is shown and described relative to FIG. 1, it is understood that a row bar may instead be provided with multiple trigger devices. With such a row bar, the trigger devices can be positioned so that their face surfaces are at the same distances from the air bearing surface, or can instead be positioned so that their face surfaces are at different distances from the air bearing surface. In either case, the resistance of each of these trigger devices can be separately monitored during the lapping process, wherein an open circuit reading from one or all of the trigger devices can provide information regarding the relative position of the lapped surface relative to the face surface 24 of the reader device 12. If the trigger devices are positioned at different distances from the air bearing surface, each can be separately monitored, which will provide the user with multiple chances to calibrate the ELG device(s) relative to any corresponding trigger devices.

A row bar 10 may also include more than one ELG 16, such as one or more additional ELGs that are the same or different from each other, which can be provided on the same row bar. In such a configuration, the resistance of each of the ELGs can be separately monitored and compared to the readings provided by the trigger device 14, for example. If more than one ELG is provided in a particular row bar, it is possible to utilize one ELG for a certain portion of the lapping process, and then after a certain amount of material has been removed and/or a certain resistance level is reached, the angle of the lapping process can be changed and then a different ELG can be monitored, such as for controlling the pitch of the lapping process.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

The invention claimed is:

1. A row bar consisting of:
   a lapped air bearing surface that is spaced from an initial air bearing surface;
   at least one read-write head comprising a face surface;
   at least one electronic lapping guide comprising a reference surface; and
   a single trigger device comprising a reference surface, wherein the single trigger device is a digital device that is monitorable during a lapping process until a single back edge of the trigger device is lapped through to provide an open circuit reading, wherein the reference surface of each electronic lapping guide is positioned at a different distance from the initial and lapped air bearing surfaces than the reference surface of the single trigger device, wherein the reference surface of the single trigger device is below the lapped air bearing surface, and wherein the read-write head and the single trigger device comprise a multi-layer stack of materials, wherein the reference surface of at least one electronic lapping guide and the face surface of at least one read-write head are both above the lapped air bearing surface.

2. The row bar of claim 1, wherein a distance from the reference surface of each electronic lapping guide to the initial and lapped air bearing surfaces is greater than distance from the reference surface of the single trigger device to the initial and lapped air bearing surfaces.

3. The row bar of claim 1, wherein the read-write head and the single trigger device are configured from materials that respond in the same manner to wafer processing.

4. The row bar of claim 1, wherein the read-write head and the single trigger device comprise identical materials.

5. The row bar of claim 1, wherein at least one of the electronic lapping guides comprises a single layer material.

6. The row bar of claim 1, further comprising a plurality of electronic lapping guides.

7. The row bar of claim 6, wherein the reference surface of each of the plurality of electronic lapping guides is positioned at a different distance from the initial and lapped air bearing surfaces.

8. The row bar of claim 1, wherein the single trigger device comprises a resistance that is generally constant during the lapping process until the open circuit reading is detected.

9. The row bar of claim 1, wherein the multi-layer stack of materials of the read-write head comprises multiple layers that are identical to multiple layers of the multi-layer stack of materials of the single trigger device.

10. The row bar of claim 1, wherein the single trigger device is electrically connected to a structure that provides for monitoring of resistance of the trigger device in real time during the lapping process.

11. The row bar of claim 10, wherein the structure comprises a gold pad.

* * * * *